United States Patent
Rüf

(10) Patent No.: US 6,488,876 B1
(45) Date of Patent: Dec. 3, 2002

(54) COMPOSITION CONTAINING FINE SOLID PARTICLES

(75) Inventor: Harmut Rüf, Vöcklabruck (AT)

(73) Assignee: Lenzing Aktiengesellschaft, Lenzing (AT)

( * ) Notice: Subject to any disclaimer, the term of this patent is extended or adjusted under 35 U.S.C. 154(b) by 0 days.

(21) Appl. No.: 09/244,322

(22) Filed: Feb. 3, 1999

Related U.S. Application Data

(63) Continuation of application No. PCT/AT98/00147, filed on Jun. 16, 1998.

(30) Foreign Application Priority Data

Jun. 16, 1997 (AT) .............................................. 1041/97

(51) Int. Cl.⁷ ................................................. D01F 9/00
(52) U.S. Cl. ................. 264/186; 106/200.1; 106/200.2; 106/200.3; 264/187; 264/211; 264/211.11; 264/211.14; 524/35; 524/96
(58) Field of Search ................. 524/96, 35; 106/200.2, 106/200.3, 200.1; 264/186, 187, 211, 211.11, 211.14

(56) References Cited

U.S. PATENT DOCUMENTS

| | | | | |
|---|---|---|---|---|
| 2,179,181 A | | 11/1939 | Graenacher et al. .......... 106/40 |
| 4,142,913 A | * | 3/1979 | McCorsley, III et al. ... 106/186 |
| 4,144,080 A | | 3/1979 | McCorsley, III ............ 106/186 |
| 4,211,574 A | * | 7/1980 | McCorsley, III et al. ... 106/163 |
| 4,246,221 A | * | 1/1981 | McCorsley, III ............ 264/203 |
| 4,416,698 A | * | 11/1983 | McCorsley, III ........ 106/163 R |
| 5,053,138 A | * | 10/1991 | Korger et al. ................ 210/670 |
| 5,094,690 A | | 3/1992 | Zikeli et al. ................. 106/198 |
| 5,189,152 A | * | 2/1993 | Hinterholzer et al. ......... 536/56 |
| 5,370,322 A | * | 12/1994 | Gray et al. .................... 241/19 |
| 5,456,748 A | * | 10/1995 | Quigley et al. ............. 106/203 |
| 5,602,247 A | * | 2/1997 | Mulleder et al. .............. 536/57 |
| 5,688,435 A | * | 11/1997 | Chang et al. .......... 252/187.25 |
| 5,895,795 A | * | 4/1999 | Hashemzadeh ............... 524/35 |
| 5,948,905 A | * | 9/1999 | Connor et al. .............. 536/124 |
| 6,042,769 A | * | 3/2000 | Gannon et al. .............. 264/203 |

FOREIGN PATENT DOCUMENTS

| | | |
|---|---|---|
| DE | 2844163 | 4/1981 |
| DE | 218104 | 1/1985 |
| WO | WO 8304415 | 12/1983 |
| WO | WO 9312173 | 6/1993 |
| WO | WO 9313670 | 7/1993 |
| WO | WO 9420653 | 9/1994 |
| WO | WO 9507811 | 3/1995 |
| WO | WO 9627638 | 9/1996 |
| WO | WO 9702315 | 1/1997 |

* cited by examiner

*Primary Examiner*—Judy M. Reddick
(74) *Attorney, Agent, or Firm*—Baker Botts LLP

(57) ABSTRACT

The invention relates to a composition intended to be admixed to a moldable solution of cellulose in an aqueous tertiary amine oxide, which composition consists of
  solid particles,
  a mixture of a tertiary amine oxide and water, in which the solid particles are dispersed, and
  at least a further substance,
with the proviso that the solid particles and said at least further substance are different from cellulose and that the content of water is such that no cellulose will precipitate when admixing the composition to the moldable cellulose solution. The composition according to the invention is storage stable to a high degree and suitable for introducing additives into the moldable cellulose solution.

3 Claims, No Drawings

COMPOSITION CONTAINING FINE SOLID PARTICLES

This is a continuation of application No. PCT/AT98/00147, filed Jun. 16, 1998.

The present invention relates to a composition containing fine solid particles and intended to be admixed to a moldable solution of cellulose in an aqueous tertiary amine oxide.

BACKGROUND OF THE INVENTION

From U.S. Pat. No. 2,179,181 it is known that tertiary amine oxides are capable of dissolving cellulose and that cellulosic molded bodies such as fibers may be obtained from such solutions by precipitation (amine oxide process). A process for producing solutions of this kind is known, for instance, from EP-A-0 356 419. According to that publication, a suspension of cellulose in an aqueous tertiary amine oxide is initially prepared. The amine oxide contains up to 40% by mass of water. The aqueous cellulose suspension is heated and water is drawn off under a pressure decrease until the cellulose is dissolved.

For the production of cellulose fibers it is known from DE-A-28 44 163 to provide an air path or air gap between spinneret and precipitation bath in order to obtain a spinneret draft. That spinneret draft is necessary, since stretching of the threads is rendered very difficult after a contact of the formed spinning solution with the aqueous precipitation bath. The fiber structure adjusted in the air gap is fixed in the precipitation bath.

A process for producing cellulosic threads is, furthermore, known from DE-A-28 30 685, according to which a solution of cellulose in a tertiary amine oxide is molded to filaments in the hot state, the filaments are cooled with air and subsequently introduced into a precipitation bath in order to precipitate the dissolved cellulose. The surfaces of the as-spun threads, in addition, are wetted with water in order to reduce their tendency to adhere to neighboring threads.

A device and a process for producing seamless tubular films are known from WO 93/13670. According to that known process, the cellulose solution is molded to a tube by an extrusion die having an annular extrusion gap, which tube is drawn over a cylindrical mandrel and introduced into a precipitation bath. In order that the extruded tube will not adhere to the surface of the mandrel, its surface is coated with a water film in a manner that the inner side of the tube coagulates and slides over the cylindrical mandrel. The tubular films obtained have wet strengths of approximately 10 to 30 $N/mm^2$.

Also WO 95/07811 describes a device and a process for producing cellulosic tubular films.

It is known to produce fibers and films containing additives aimed at modifying and improving the properties of the same. Thus, such additives are, for instance, added in order to deluster or dye products or render them flame retardant and stable to light, or in order to optically brighten them. In case of synthetic materials such additives, as a rule, are added prior to polymerization. It is also known to add the additives as a socalled masterbatch in powder form or as a dispersion by means of an extruder.

WO 93/12173 describes the use of flame retardants in artificial fibers and polyurethane foam. It can, however, not be taken from that document in what way those flame retardants are incorporated in the fibers.

WO 94/20653 describes fibers made of regenerated cellulose and comprising hollow beads having diameters of from 0.1 to 1.5 $\mu m$ as an alternative to titanium dioxide. The beads are made of a material that does not react with the spinning dope, e.g., of styrene/acrylic acid copolymer. That copolymer is added to a viscose as a slurry in water, wherein the copolymer is contained by 10% only, said viscose being subsequently filtered and spun to fibers. It is expressly recommended to add the aqueous slurry in a form of the viscose diluted with water instead of its concentrated form.

In WO 96/27638 a process for preparing a composition containing an additive in the form of fine solid particles provided with an envelope or dispersed in a matrix is described. That composition is prepared by homogenously dispersing the solid particles in a heated solution of cellulose in an aqueous tertiary amine oxide. The dispersion obtained can be fed to the spinning mass in the heated state. The solution used for preparing the dispersion must contain sufficient cellulose in order to impart on said solid particles an at least monomolecular layer of cellulose all over their surfaces during dispersion. It is, furthermore, recommended, to dimension the cellulose content in a manner that the dispersed particles will each be enveloped by a multimolecular layer.

That process, however, involves the disadvantage that dispersions based on a tertiary amine oxide which additionally contain cellulose and are heated to the temperature of use will change their colors due to degradation reactions occurring in the cellulose. This means that such dispersions are not storage stable, introducing impurities (cellulose degradation products) into the spinning mass and hence into the cellulosic end products.

SUMMARY OF THE INVENTION

The invention has as its object to overcome these drawbacks and provide a composition which contains an additive and may be admixed to a moldable cellulose solution in order to modify the properties of a molded body produced of said cellulose solution.

DETAILED DESCRIPTION OF THE PREFERRED EMBODIMENTS

This object is achieved with a composition intended to be admixed to a moldable solution of cellulose in an aqueous tertiary amine oxide, which composition consists of
  solid particles,
  a mixture of a tertiary amine oxide and water, in which the solid particles (=additive) are dispersed, and
  at least a further substance,
with the proviso that the solid particles and said at least further substance are different from cellulose and that the content of water is such that no cellulose will precipitate when admixing the composition to the moldable cellulose solution (spinning dope).

It has been shown that it is not necessary to deposit on the solid particles an at least monomolecular layer of cellulose in order to be able to homogenously distribute the composition within the spinning dope. This not only facilitates the preparation of the composition, but also enhances the quality of the molded bodies produced. In addition, the additive composition according to the invention is storage stable to a higher degree than prior art compositions. What is, however, decisive is the water content of the composition according to the invention, which must not be so high that the composition acts as a precipitant within the spinning dope.

N-methylmorpholine-N-oxide is preferably used as the tertiary amine oxide in the composition according to the invention.

As a further substance, a stabilizer for the tertiary amine oxide, in particular NaOH, a phosphate, a phosphonate or oxalic acid, may be provided in the composition according to the invention.

As an additional further substance, a dispersion assisting agent, in particular polyvinyl alcohol, polyacrylic acid and its derivatives, polyalkylene oxide and its derivatives, polyethylene imine and/or polyvinyl pyrrolidone, may be provided in the composition according to the invention.

As solid particles, a pigment may be provided in the composition according to the invention.

The invention, furthermore, relates to a process for preparing the composition according to the invention, wherein solid particles are introduced into, and dispersed in, a liquid solvent for cellulose with the proviso that the composition does not contain any cellulose.

A stabilizer for the solvent and/or a dispersion assisting agent may also be introduced.

The invention also relates to a process for preparing a moldable solution of cellulose in a tertiary amine oxide, which is characterized in that the composition according to the invention is introduced into a solution of cellulose in a tertiary amine oxide, this preferably being effected continuously.

Cellulosic molded bodies may be produced by molding the moldable solution according to the invention and contacting the same with a cellulose precipitating agent. A spinneret for producing fibers or a slitted spinneret for producing flat or tubular films is preferably used for molding.

Preferred embodiments of the invention will be explained in more detail by way of the following inventive examples, wherein Inventive Examples 1 and 2 demonstrate the influence of cellulose on the discoloration of the solution. Inventive Examples 3 to 7 relate to the preparation of the composition according to the invention, its admixture to a moldable cellulose solution and the production of cellulose fibers having a titer of less than 2 dtex.

Any percentages indicated in the Examples are percent by mass.

INVENTIVE EXAMPLE 1

According to the process described in WO 96/27638, 554 g aqueous NMMO (water content: 83%), 11.3 g cellulose (Solvekraft LV; manufacturer: International Paper) and 0.8 g gallic acid propyl ester as a cellulose stabilizing agent were charged into a vessel and heated to 95° C. under stirring until the cellulose had been dissolved.

During cellulose dissolution a discoloration was observed, the intensity of which was determined in the following manner:

The solution was allowed to cool and subsequently was ground in a laboratory mill. 1.5 g cooled and ground cellulose solution was weighed into a beaker glass and mixed with 4.5 g water in order to precipitate the cellulose and extract the color components. After this, the solid components were filtered off and the aqueous phase was photometrically measured at 470 nm (1 cm layer thickness). The results (extinction) are indicated in the Table below.

INVENTIVE EXAMPLE 2

A mixture of 554 g aqueous NMMO (water content: 83%, adjusted to pH 12 with NaOH) and 11.3 g polyvinyl alcohol (MW: 50,000; Aldrich No. 34,158-4) were placed in a vessel and heated to 95° C. under stirring. The color intensity of the solution was measured as in Example 1. The results are indicated in the Table below.

TABLE

| Example | Start | 1 Hour | 18.5 Hours |
| --- | --- | --- | --- |
| 1 | 0.114 | 0.122 | 0.210 |
| 2 | 0.0437 | 0.0492 | 0.0455 |

From the Table it is apparent that the presence of cellulose causes an intensive discoloration of the solution.

INVENTIVE EXAMPLE 3

A dispersion having the following composition was prepared by means of a rotor stator unit (Ultra-Turrax; IKA) at 25° C.:

30% $TiO_2$ (Type 1047; Kronos) as a pigment,

1% polyacrylic acid (FLUKA CHEMIKA; medium viscosity; No.81140) as a dispersion assisting agent, and 69% aqueous NMMO (13% water; adjusted to pH 12 with NaOH)

The dispersion obtained was dosed into a cellulosic spinning dope (15% sulfite pulp; 75% NMMO; 10% $H_2O$) at a rate of 0.99 g/min to 196 g/min by means of a piston-controlled dosing pump. After homogenization of the pigment distribution within the spinning dope by means of a static mixer (SMX DN40 with 12 mixing elements; Sulzer), the homogenous spinning dope mixed with $TiO_2$ was fed to a spinneret (3960 holes; 100 μm) at a temperature of 120° C. and spun to fibers having a titer of 1.7 dtex. The fibers obtained had a pigment content of 1%.

INVENTIVE EXAMPLE 4

It was proceeded in a manner analogous to Example 3, yet with polyvinyl alcohol (MW 50,000; ALDRICH No. 34,158-4) having been used as a dispersion assisting agent.

Also with this spinning dope no problems were faced during spinning.

INVENTIVE EXAMPLE 5

It was proceeded in a manner analogous to Example 3, yet with polyacrylamide (ALDRICH No. 18,127-7) having been used as a dispersion assisting agent.

Also with this spinning dope no problems were faced during spinning.

INVENTIVE EXAMPLE 6

By means of the rotor stator unit employed in Example 3, a dispersion having the following composition was prepared at 80° C.:

20% Soot (Printex 3007; Kronos) as a pigment,

1% polyoxalkylated polyalkylaminoalcohol (Hypermer PS 2; ICI) as a dispersion assisting agent, and 78.9% aqueous NMMO (13% water) and 0.1% oxalic acid.

The dispersion obtained was dosed into a cellulosic spinning dope (15% sulfite pulp; 75% NMMO; 10% $H_2O$) at a rate of 7.42 g/min to 188 g/min by means of a piston-controlled dosing pump. After homogenization of the pigment distribution within the spinning dope by means of the static mixer mentioned in Example 3, the homogenous spinning dope mixed with soot was fed to a spinneret (3960 holes; 100 μm) at a temperature of 120° C. and spun to fibers having a titer of 1.7 dtex. The fibers obtained had a soot content of 5%.

INVENTIVE EXAMPLE 7

By means of the rotor stator unit employed in Example 3, a dispersion having the following composition was prepared:

30% Antimony pentoxide (Nyacol ZTA; PQ Corporation) as a pigment,

1% polyoxalkylated polyalkylaminoalcohol (Hypermer PS 2; ICI) as a dispersion assisting agent, and 68.9% aqueous NMMO (13% water) and 0.1% 1-hydroxyethylidene-1,1-diphosphonic acid.

The dispersion obtained was dosed into a cellulosic spinning dope (15% sulfite pulp; 75% NMMO; 10% $H_2O$) at a rate of 19.8 g/min to 158 g/min by means of a piston-controlled dosing pump. The piston-controlled dosing pump and the dispersion feed were kept at a temperature of 80° C.

After homogenization of the pigment distribution within the spinning dope by means of the static mixer mentioned in Example 3, the homogenous spinning dope mixed with antimony pentoxide was fed to a spinneret (3960 holes; 100 μm) at a temperature of 120° C. and spun to fibers having a titer of 1.7 dtex. The fibers obtained had an antimony pentoxide content of 20%.

I claim:

1. A process for producing cellulosic molded bodies comprising:
   (a) providing solid particles,
   (b) providing a liquid solvent for cellulose comprising a tertiary amine oxide and water,
   (c) introducing and dispersing said solid particles into the liquid solvent thereby forming a composition wherein the composition is free of cellulose,
   (d) introducing the composition formed in (c) into a solution of cellulose in a tertiary amine oxide, and
   (e) molding the solution prepared in (d) and
   (f) contacting the resultant molded solution of (e) with a cellulose precipitating agent.

2. A process according to claim 1 wherein the solution is molded by means of a spinneret and forms cellulosic fibers upon contact with said precipitating agent.

3. A process according to claim 1 wherein the solution is molded by means of a slitted spinneret and forms a film upon contact with the cellulose precipitating agent.

* * * * *